B. V. H. JOHNSON & C. T. WESTLAKE.
TRAILER TRUCK FRAME FOR LOCOMOTIVES.
APPLICATION FILED FEB. 4, 1914.
1,099,376.
Patented June 9, 1914.
2 SHEETS—SHEET 2.
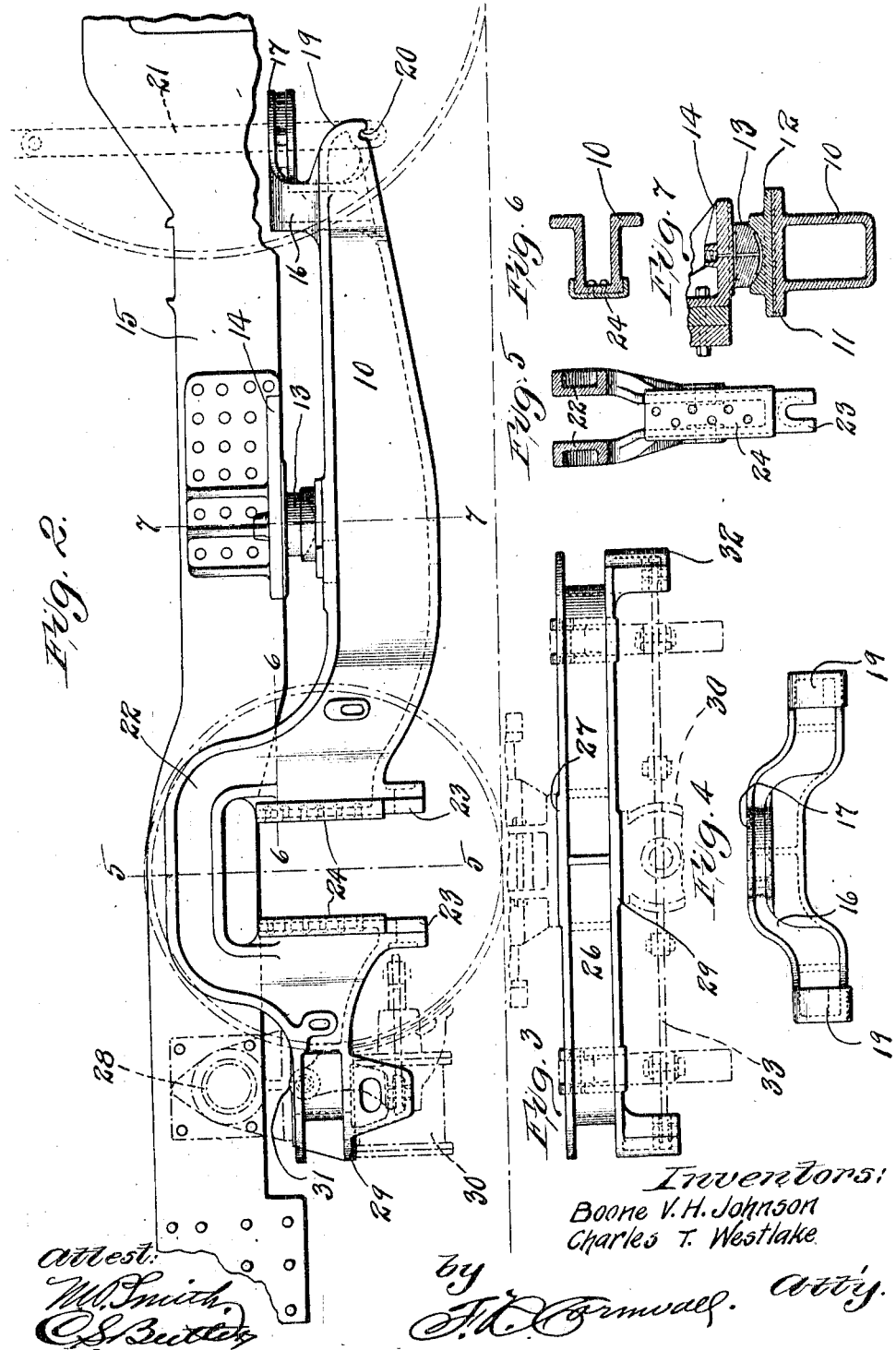
Inventors:
Boone V. H. Johnson
Charles T. Westlake

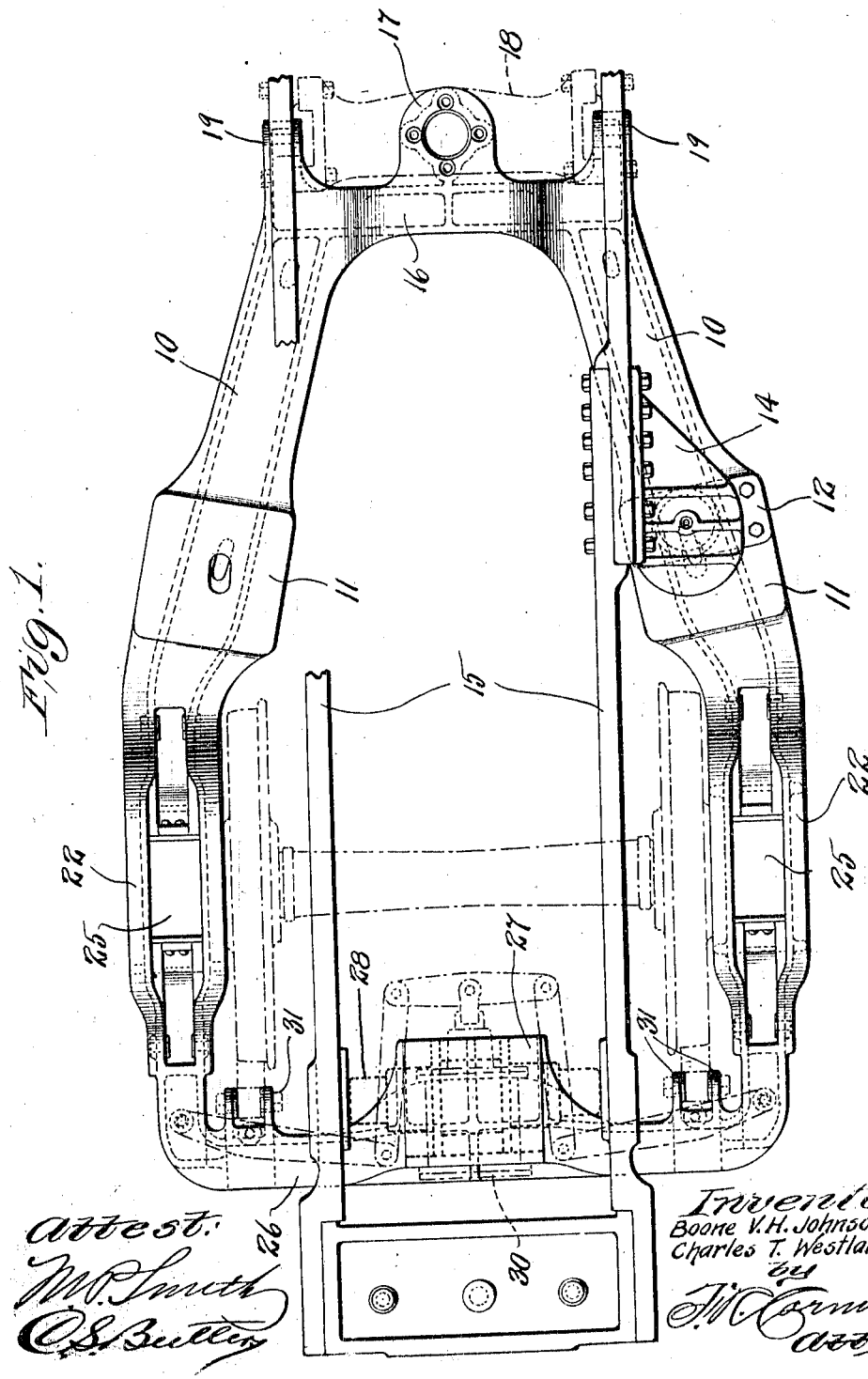

UNITED STATES PATENT OFFICE.

BOONE V. H. JOHNSON AND CHARLES T. WESTLAKE, OF ST. LOUIS, MISSOURI, ASSIGNORS TO DOUBLE BODY BOLSTER COMPANY, OF ST. LOUIS, MISSOURI, A CORPORATION OF NEW JERSEY.

TRAILER-TRUCK FRAME FOR LOCOMOTIVES.

1,099,376.  Specification of Letters Patent.  Patented June 9, 1914.

Application filed February 4, 1914. Serial No. 816,482.

*To all whom it may concern:*

Be it known that we, BOONE V. H. JOHNSON and CHARLES T. WESTLAKE, citizens of the United States, residing at the city of St. Louis, State of Missouri, have invented a certain new and useful Improvement in Trailer-Truck Frames for Locomotives, of which the following is a full, clear, and exact description, such as will enable others skilled in the art to which it appertains to make and use the same, reference being had to the accompanying drawings, forming part of this specification, in which—

Figure 1 is a plan view of a locomotive trailer truck frame of our improved construction. Fig. 2 is a side elevational view of the truck frame, the same being shown associated with a part of the locomotive frame. Fig. 3 is a rear elevational view of our improved trailer truck frame. Fig. 4 is a front elevational view of the truck frame. Fig. 5 is a vertical section taken on the line 5—5 of Fig. 2. Fig. 6 is a horizontal section taken on the line 6—6 of Fig. 2. Fig. 7 is a vertical section taken on the line 7—7 of Fig. 2.

Our invention relates to a trailer truck frame for locomotives, *i. e.*, the frame of the truck which receives the trailer wheels and supports the locomotive boiler to the rear of the back drivers.

The principal object of our invention is to form a trailer truck frame in a single piece, preferably by casting, and to form integral with said frame various parts in the form of brackets and bearings, which latter are particularly designed to receive devices necessarily associated with the trailer truck, such as the air brake cylinder, brake hangers, brake lever fulcrums, pedestals, centering device, friction plates, front pivot and the like.

Heretofore in the construction of trailer truck frames for locomotives, it has generally been the practice to construct the frame in parts, and to assemble and fasten said parts to each other by means of rivets, bolts and like fastening devices, but such construction has many disadvantages for the reason that the strains and constant vibration developed while the truck is in service tends to loosen the joints between the assembled parts, thereby destroying the stability of the frame and the alinement and position of the bearings and brackets which receive the various devices necessarily associated with and carried by the truck frame.

It is the purpose of our invention to overcome the objectionable features just mentioned by casting the truck frame, brackets and bearings in one piece for by doing so we are able to produce a very strong, substantial structure which, in service, effectually resists all strains to which it is ordinarily subjected, and which is not affected by the constant vibration developed while the truck is in service.

A one piece casting can be produced with the expenditure of considerably less time and labor than a frame built up from a number of structural shapes and castings united by bolts, rivets and the like, and necessarily the one piece structure has greater strength than a fabricated frame. We have demonstrated in practice that a trailer truck frame cast in one piece, while of lighter weight, has much greater strength than a built up frame. Moreover, the one piece frame has no joints to work loose, materially reduces maintenance cost and in service tends to prevent excessive transverse movement of "nosing" of the front portion of the locomotive.

To the above purposes our invention consists in certain novel features of construction and arrangement of parts, hereinafter more fully described and claimed.

As shown in the accompanying drawings, our improved trailer truck frame includes a pair of side members 10 which are preferably box shape in cross section, and formed integral with the tops of these side members are plates 11 which serve as bases for friction plate supporting bearings 12. These bearings are fixed to the side members 10 in any suitable manner and receive plano convex bearing disks 13 which serve as bearings for brackets 14 that project outwardly and downwardly from the side members 15 of the locomotive frame.

The side members 10 preferably converge toward their forward ends and uniting said forward ends is a transverse front end member 16 which is preferably arched. Formed integral with and projecting forwardly from this forward end member is a bracket or bearing 17. This bracket receives the pin which pivotally connects the trailer truck frame to the locomotive frame, said pin being also mounted in a transverse member or transom 18 forming a part of the locomotive frame.

Formed integral with and projecting forwardly from the ends of the front end member 16 are short brackets 19, and formed in the underside thereof are notches 20 which are adapted to receive keys seated in the lower ends of spring hangers 21, the same forming hangers between the forward portion of the truck frame, and the locomotive springs. The rear portions of the side members 10 are arched as designated by 22 to form the vertically disposed pedestals 23, and fixed in any suitable manner to the inner faces of these pedestals are liners or wear plates 24, between which the usual journal boxes are positioned.

The upper portions of the arches 22 are bifurcated or slotted lengthwise as designated by 25 in order to accommodate the springs which rest upon the trailer truck journal boxes. The rear end of the side members 10 are united by an integral rail 26, the same being preferably of channel or I-beam shape in cross section, and formed integral with the central portion and top of this rear rail is a horizontally disposed plate 27 which forms a supporting base or bracket for the truck centering device 28. This centering device is of the usual type, employing a pair of spring pressed plungers operating in a suitable housing and the outer ends of which plungers normally bear against the inner faces of members 15 of the locomotive frame.

Movement of the truck frame to one side or the other effects a compression of the springs behind the plungers of the centering device, and thus said truck frame is yieldingly held in central position with respect to the locomotive frame.

Formed integral with the central portion and underside of the rear rail 26 is a horizontally disposed plate or bracket 29 which serves as a support and a point of attachment for the trailer truck brake cylinder 30. Formed integral with the rear rail 26 and on the inside thereof are pairs of brackets 31, the same being adapted to receive the upper ends of brake hangers.

Formed integral with the rear ends of the members 10 and adjacent to the points where the same unite with the rear rail 26 are depending brackets 32 which serve as fulcrums for the outer ends of brake levers 33. The inner ends of the brake levers are connected in any suitable manner to the piston of the brake cylinder 30.

The space between the front member 16 and the trailer truck axle is free and open as shown in Fig. 1 for the accommodation of the depending portion of the locomotive ash pan.

A trailer truck frame of our improved construction is very strong, can be easily and cheaply produced inasmuch as it can be readily cast in a single piece, and by forming integral with said frame a number of essential brackets and bearings, much time, labor and consequent expense incident to the attaching of separate brackets and bearings is saved. Furthermore, the elimination of joints in the truck frame does away with structural weaknesses which invariably develop where an assembled or fabricated structure is subjected to constant service strains and vibration.

It will be readily understood that minor changes in the size, form and construction of the various parts of our improved trailer truck may be made and substituted for those herein shown, and described, without departing from the spirit of our invention, the scope of which is set forth in the appended claims.

We claim:

1. As a new article of manufacture, a locomotive trailer truck frame formed in a single piece, and comprising end members and side members, portions of which are arched to form pedestals.

2. A locomotive trailer truck frame formed in a single piece and comprising side members, end members, and a brake cylinder bracket.

3. A locomotive trailer truck frame formed in a single piece and comprising side members, end members, a front pivot bearing and brake hanger brackets.

4. As a new article of manufacture, a locomotive trailer truck frame formed in a single piece and comprising side members, end members, and brake fulcrum brackets.

5. A locomotive trailer truck frame formed in a single piece and comprising end members and side members, portions of which are of inverted U-shape and the vertical legs of which inverted U-shaped portions constitute pedestals.

6. A locomotive trailer truck frame formed in a single piece and comprising side members, end members, and a centering device bracket.

7. As a new article of manufacture, a locomotive trailer truck frame formed in a single piece and comprising side members, end members, and friction plate supporting brackets.

8. As a new article of manufacture, a locomotive trailer truck frame formed in a single piece and comprising side members, ends members, and a front pivot bearing.

9. As a new article of manufacture, a locomotive trailer truck frame formed in a single piece and comprising side members, end members, and forwardly projecting brackets which are notched to receive spring hanger keys.

10. As a new article of manufacture, a locomotive trailer truck frame formed in a single piece and comprising side members, end members, and spring hanger attaching brackets.

11. As a new article of manufacture, a locomotive trailer truck frame formed in a single piece and comprising side members, end members, and pedestals, the upper portions of which are slotted to accommodate the springs which rest upon the journaled boxes positioned between said pedestals.

12. As a new article of manufacture, a locomotive trailer truck frame formed in a single piece and comprising side members, provided with inverted U-shaped portions adapted to form pedestals, the upper portions of which are slotted to receive the springs which rest upon the journal boxes positioned between said pedestals, and transverse members connecting the ends of said side members.

13. A locomotive trailer truck frame cast in a single piece and comprising side pieces having inverted U-shaped portions which constitute pedestals, friction plate supporting brackets on said side members, a transverse member uniting the forward ends of said side members, a front pivot bearing on said transverse member, a transverse member connecting the rear portions of the side members, and a brake cylinder bracket on said rear transverse member.

14. A locomotive trailer truck frame cast in a single piece and comprising side pieces having inverted U-shaped portions which constitute pedestals, friction plate supporting brackets on said side members, a transverse member uniting the forward ends of said side members, a front pivot bearing on said transverse member, a transverse member connecting the rear portions of the side members, and brake hanger brackets on said rear transverse member.

15. A locomotive trailer truck frame cast in a single piece and comprising side pieces having inverted U-shaped portions which constitute pedestals, friction plate supporting brackets on said side members, a transverse member uniting the forward ends of said side members, a front pivot bearing on said transverse member, a transverse member connecting the rear portions of the side members, and brake lever fulcrum brackets on said rear transverse member.

16. A locomotive trailer truck frame cast in a single piece and comprising side pieces having inverted U-shaped portions which constitute pedestals, friction plate supporting brackets on said side members notched brackets on the forward ends of said side members, which notched brackets are adapted to receive spring hanger keys, a transverse member uniting the forward ends of said side members, a front pivot bearing on said transverse member, a transverse member connecting the rear portions of the side members, and a brake cylinder bracket on said rear transverse member.

In testimony whereof we hereunto affix our signatures in the presence of two witnesses, this 17th day of January, 1914.

BOONE V. H. JOHNSON.
CHARLES T. WESTLAKE.

Witnesses:
 FRED H. BLANKENHORN,
 HAL C. BELLVILLE.